UNITED STATES PATENT OFFICE.

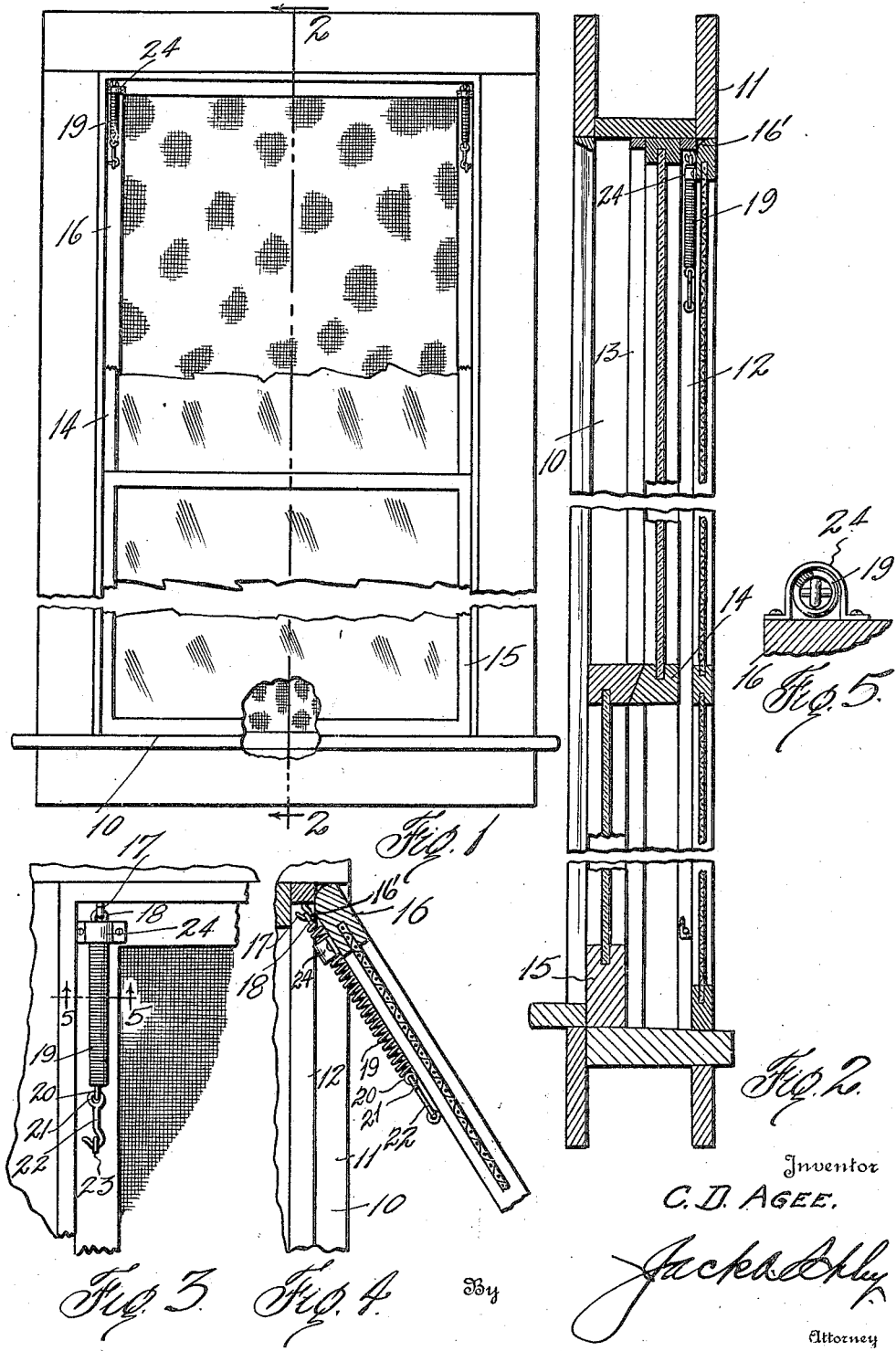

CHARLEY D. AGEE, OF DALLAS, TEXAS.

WINDOW-SCREEN HANGER.

1,424,431.   Specification of Letters Patent.   Patented Aug. 1, 1922.

Application filed January 23, 1922. Serial No. 531,152.

*To all whom it may concern:*

Be it known that I, CHARLEY D. AGEE, a citizen of the United States, residing at Dallas, in the county of Dallas and State of Texas, have invented certain new and useful Improvements in Window-Screen Hangers, of which the following is a specification.

This invention relates to new and useful improvements in window screen hangers.

The object of the invention is to provide a hanger which is invisible from the outside of the window and which does not require the mounting of plates or clips in the top of the frame. Another object is to provide an improved resilient hanger which will support the screen from within the frame and hold the top of the screen up against the top of the frame.

A particular object is to provide a keeper for confining the upper portion of the resilient hanger against the screen whereby the upper portion of the screen is held in close contact with the blind stop and flush with the outside casing. This prevents the top of the screen from projecting out from the casing and becoming unsightly.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is an elevation of the inside of a window, the upper sash being broken away to show hangers embodying the invention, supporting a screen.

Fig. 2 is an enlarged vertical sectional view,

Fig. 3 is an enlarged detail of the hanger,

Fig. 4 is an enlarged partial vertical sectional view showing the screen swung open, and Fig. 5 is a cross section on the line 5—5 of Fig. 3.

In the drawing the numeral 10 designates an ordinary window frame having an outside casing 11, a blind stop 12, a parting strip 13, an upper sash 14 sliding between the blind stop and the strip and the usual lower sash 15. The outer face of the stop 12 is usually flush with the inner edge of the casing 11 and by giving the frame 16 on the screen the same thickness as the casing, said frame will be flush with the outer face of said casing.

The invention has particularly to do with the hangers. On the top horizontal stop 12, I provide a hook 17 near each end. With each hook, the eye 18 at the upper end of a coiled extension spring 19, is engaged. Each spring has an eye 20 at its lower end receiving the eye 21 of a hook 22 which is adapted to engage in a screw eye 23 mounted on the inner side of the screen frame, usually about 6 inches below the hook 17, but this distance may vary.

It will be seen that the eyes 18 may be quickly engaged with or disengaged from the hooks 17. The hangers can be easily connected with the screen frame by means of the hooks 22, or disconnected therewith. If at any time the springs should become stretched, it would be a very simple operation to lower the screen eyes 23.

No claim is made to the use of a coiled spring alone and the essential, important and advantageous feature of the invention is a keeper 24 straddling the upper portion of each spring and fastened to the inner side of the screen frame. Hangers without these keepers have been in use and are not satisfactory because they do not hold the top of the screen frame against the blind stop and within the window frame.

It will be seen that the point of connection of the spring with the screen, being some distance below the hooks 17, no means would be had for holding the top rail of the screen frame against outward displacement. This has two disadvantages, first it permits the top of the screen to spring outward beyond the face of the casing, particularly after the screen has been opened, which gives an unsightly appearance and allows rain water to pass in behind the screen frame; and second, such a condition tends to cause warping and distortion of the screen frame.

These objections and disadvantages are overcome by the keepers 24. These keepers are located immediately under the eyes 18 as is shown best in Fig. 3. Sufficient clearance is given to permit the spring to slide through the keeper, as when the screen is swung outwardly as is shown in Fig. 4. It will be seen that when the screen is closed the spring will pull the same up against the top of the window frame, while the keepers will pull the screen frame against the blind stop 12, whereby the top of said screen will be tightly held in place.

The hangers are easily disengaged by first removing the hooks 22 from the screw eyes 23, then the spring 19 may be easily pushed upwardly through the keepers and the eyes 18 disengaged from the hooks 17. The keepers are easily applied and are concealed by the screen frame and the upper sash. This application is in part a continuation of my application Serial No. 322,119.

In order to provide a hinge bearing surface for the frame 16, the upper inner edge is rounded at 16', as is best shown in Fig. 4. This is of importance, as it will be seen that when the screen is swung outwardly, said rounded edge will readily ride against the outer face of the blind stop 12, without binding thereon. It is also obvious that if the upper inner edge were not rounded at 16', said edge would abut the underside of the blind stop when the screen is in outward position, and thereby prevent the latter from automatically swinging inwardly when released. The rounded edge at 16' overcomes all disagreeable conditions of this nature, by providing a hinge bearing surface for the said frame 16.

What I claim, is:

1. In a window screen hanger structure, a pair of coiled springs each having one end adapted for attachment to a window screen frame and the other end adapted to engage a supporting fixture in a window frame, and a pair of keepers each adapted to confine the upper portion of one of said springs against the upper portion of a screen frame, whereby said upper screen frame portion is held against outward displacement when the screen frame is in a perpendicular position.

2. The combination in a window screen hanger, of an extension coiled spring having eyes at each end, a supporting hook engaged by one of the eyes, a screen hook pivoted in the other eye, a screw eye for engaging a screen frame and engaged by the screen hook, and a keeper for straddling one end portion of the spring for confining the same against a screen frame.

3. The combination with a window frame, the blind stop thereof, and a screen frame fitting in the window frame and contacting with the blind stop, of hooks depending from the blind stop at each side of the top of the window frame, a pair of coiled extension springs each having its upper end engaged with one of the stop hooks, screw eyes mounted in the screen frame, screen hooks pivoted to the lower ends of the springs and engaging the screw eyes, and keepers straddling the upper ends of the springs and fastened to the screen frame for holding the upper end of the screen frame in contact with the blind stop, when the screen is closed.

4. The combination of a window frame having a blind stop, a screen frame fitting in the window frame and contacting with the blind stop, the upper inner edge of said screen frame being rounded to provide a hinge bearing surface, hooks depending from the blind stop at each side of the top of the window frame, a pair of coiled extension openings each having its upper end engaged with one of the stop hooks, screen eyes mounted in the screen frame, screen hooks pivoted to the lower ends of the springs and engaging the screw eyes, and keepers straddling the upper ends of the springs and fastened to the screen frame for holding the upper end of the screen frame in contact with the blind stop, when the screen is closed.

In testimony whereof I affix my signature.

CHARLEY D. AGEE.